INVENTOR.
BY WALTER C. ROWE
W. A. Fraser

United States Patent Office 2,979,099
Patented Apr. 11, 1961

2,979,099

STAIN RESISTANT WHITE SIDEWALL TIRE

Walter C. Rowe, Akron, Ohio, assignor to The Firestone Tire & Rubber Company, Akron, Ohio, a corporation of Ohio Filed Mar. 11, 1958, Ser. No. 720,639

7 Claims. (Cl. 152—330)

This application is a continuation-in-part of copending application Serial No. 613,095, now abandoned.

This invention relates to the prevention of staining in light color rubber objects and more particularly to the prevention of staining which occurs in the white sidewall of a tire due to the migration of pigments from compounds used in other portions of the tire.

In the compounding of the many rubber stocks used throughout the body in the manufacture of a black sidewall tire, there is no problem of subsequent discoloration of the sidewall, and therefore no precautions need be taken in this regard. Thus, high percentages of reclaimed rubber may be compounded into the body with the resulting advantage of reduced cost and an improvement in factory processing of the stock used. Likewise, the selection of oils and softeners used in all black tire body stocks is not limited by the problem of staining characteristics and therefore the wide range of ordinary softeners known to the rubber industry is available for use in such tires. The same is true in the case of antioxidants. On the other hand, when used in white sidewall tires, these materials have a tendency to migrate to and discolor the lighter sidewall stock.

In handling body stock in a tire factory, much time and effort is consumed in segregating non-staining stocks for the white sidewall tire from the stocks suitable only for black sidewall tires. Obviously, it is desirable to use the same body stock for both black and white sidewall tires because of the elimination of special handling and simplification of inventory and generally improved economy in production.

In order to construct a white sidewall tire of the quality to remain white for the entire period of the tire life, it has been necessary for the manufacturer to carefully choose oils, carbon blacks, and antioxidants which are non-staining and to eliminate altogether the use of reclaim in the body stocks. This is a costly but heretofore necessary incident.

The use of butyl-type rubber for the white sidewall member of a tire is desirable because such rubber does not stain nor pass migratory staining materials through members composed thereof. Until the present invention, the use of butyl has been unsuccessful because of the poor adhesion of butyl rubber to other rubbery components of a tire. The present invention provides a butyl-type rubber white sidewall having better adhesion to the adjacent rubbery tire components than had prior art butyl-type white sidewalls.

It is an object of this invention to provide a tire with a light colored sidewall which is resistant to pigment migration and staining. Another object is to provide a chlorinated butyl-type rubber white sidewall for a pneumatic tire, having non-staining characteristics together with greatly improved resistance to weather checking and sun checking. Another object is to provide in a laminated rubbery article a migration impervious chlorinated butyl-type rubber barrier between a light colored stock and a stock compounded from staining pigments in order to protect the light colored stock from discoloration. A further object is to provide a non-staining migration resistant chlorinated butyl-type rubber barrier between the body and the white sidewall of a white sidewall tire and having good vulcanized adhesion to those members.

Yet another object of the invention is to provide an improved rubbery member resistant to pigment staining and adhesively compatible with other rubber-like members to which it is vulcanized comprised of chlorinated butyl-type rubber and chlorosulfonated polyethylene.

Yet another object of the invention is to provide an improved rubbery member resistant to pigment staining and adhesively compatible with other rubber-like members to which it is vulcanized comprised of chlorinated butyl-type rubber and a non-reactive phenol aldehyde resin.

Yet another object of the invention is to provide an improved rubbery member resistant to pigment staining and adhesively compatible with other rubber-like members to which it is vulcanized comprised of chlorinated butyl-type rubber, a chlorosulfonated polyethylene and a non heat-reactive phenol aldehyde resin.

These and further objects will become apparent as the invention is further disclosed and particularly with reference to the drawing in which.

The advantages of the invention are accomplished by the combination in a laminated article containing staining material and a composition impervious to migration of staining material. The composition is used either in the stain impervious member itself or in a barrier between the staining body and a light colored portion. The stain resistant composition is composed of a mixture of a chlorinated butyl-type rubber and a non-reactive phenol aldehyde resin compounded with modifying ingredients. In modifications of the invention, the chlorinated butyl rubber may be modified with chlorosulfonated polythene as well as with the non-reactive phenol aldehyde resin.

Figure 1:
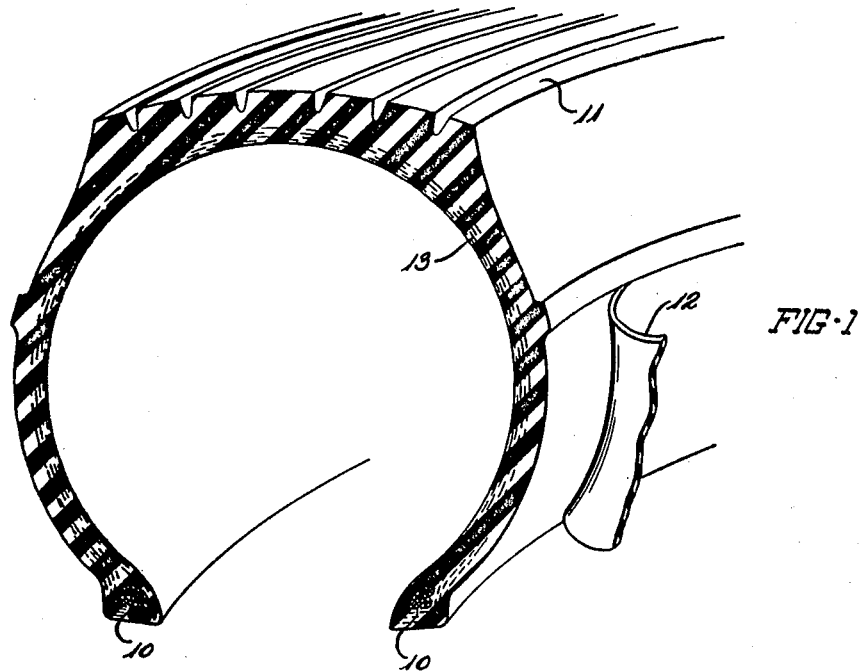
Fig. 1 is a perspective view partially in section of a black sidewall tire which embodies a white sidewall of the novel construction.

Referring to Fig. 1, an article of the invention is shown as a pneumatic white sidewall tire having beads 10, tread 11 and fabric plies 13. According to the invention, the plies 13 are compounded with a high percentage of rubber or synthetic rubber reclaim and conventional oils as well as any suitable antioxidant whether staining or non-staining. Upon this body portion is mounted a white sidewall 12 which is compounded of the novel composition hereinafter described. Although this disclosure will describe in detail the use of the invention in a white sidewall tire, it is not to be considered as limited thereto but said construction may be satisfactorily used alone or in combination in other molded, calendered or extruded vulcanized articles to attain a non-staining, age-resisting, light colored product.

In the manufacture of a tire embodying one modification of the invention, the body is built up from successive plies of rubber coated fabric. The bead portions 10 are applied in the conventional manner and the edges of the rubber coated fabric are turned up and down respectively around the beads to hold them securely. The tread portion 11 is then laid on the fabric in the conventional manner and is firmly stitched down to assure good adhesion. The novel non-staining migration resistant white sidewall formed by the extrusion or calendering of the composition hereinafter to be described is then cemented to the tire body.

Butyl rubber of the type used in the invention may be manufactured by the procedure disclosed by Robert M. Thomas and William J. Sparks in U.S. Patent No. 2,356,128 and which comprised preparing a mixture of an iso-olefin having from 4 to 8 carbon atoms such as isobutylene in the proportion of from 70 to 99.5 parts with an open-chain conjugated diolefin having from 4 to 7 carbon atoms such as butadiene or isoprene in the proportion of 30 to .5 parts. The mixture is cooled to a relatively low temperature, preferably below −50° C. in the presence of a metal halide catalyst such as aluminum chloride. The polymerization reaction results, after further treatment, in a rubbery vulcanizable material.

One procedure for chlorinating butyl rubber is disclosed in U.S. Patent No. 2,442,083. In the preferred preparation of chlorinated butyl, the polymer is mixed with a chlorinating material such as "Halane" (manufactured by the Wyandotte Chemical Company) on a two roll mill. Chlorine is thus incorporated in the polymer which then may be compounded with conventional compounding ingredients to produce a rubbery composition having vulcanization characteristics. Another chlorinating agent which may be mixed with butyl rubber on a mill is "Dactin" (sold by E. I. du Pont de Nemours & Company). From 3 to 10 parts of Halane to 100 parts of butyl is useful in the invention while 4 to 5 parts is preferred.

The non-reactive phenol aldehyde resin is preferably formed by condensing one mole of phenol or the like with one mole of formaldehyde or the like in an acid medium. Such a material may be obtained commercially under the trade name Amberol St137X.

The chlorinated butyl may be prepared according to the following formula:

COMPOUND I

| | |
|---|---|
| GR-I | 100.0 |
| Halane [1] | 4.0 |
| Stearic acid | 1.0 |

[1] Dichlorodimethyl hydantoin sold by the Wyandotte Chemical Co., Wyandotte, Mich.

The above formulation was mixed in a Banbury mixer under conditions which yielded a temperature which reached 250° F. in 4½ minutes. The resulting product was sheeted out on a mill for use as will be described.

Although certain chlorinating materials have been set out by way of example, the invention is not limited thereto. The invention resides in using butyl rubber containing at least .8% combined chlorine based on the weight of butyl rubber hydrocarbon present while ranges of from .8 to 1.5% are extremely useful with about 1% preferred.

To form sidewalls of the invention, the following compounds were prepared:

*Example*

| | 1 | 2 | 3 | 4 |
|---|---|---|---|---|
| Chlorinated Butyl | 80.00 | 80.00 | 80.00 | 95.00 |
| Chlorosulfonated Polythene | | | 20.00 | 5.00 |
| Natural Rubber | 20.00 | 20.00 | | |
| Zinc Oxide | 20.00 | 20.00 | 20.00 | 20.00 |
| Calcined Magnesia | 4.00 | 4.00 | 4.00 | 4.00 |
| Titanium Dioxide | 52.40 | 52.40 | 33.00 | 33.00 |
| Silica Oxide [1] | 29.25 | 29.25 | 39.00 | 39.00 |
| Ultramarine Blue | .20 | .20 | .20 | .20 |
| Softener | 5.00 | 5.00 | 5.00 | 5.00 |
| Sulfur | 2.85 | 2.85 | 2.50 | 2.50 |
| Accelerator [2] | 2.50 | 2.50 | 2.50 | 2.50 |
| Amberol St137X [3] | 5.00 | 10.00 | 5.00 | 5.00 |

[1] Hydrated Silica Oxide sold as "HiSil" by Columbia Southern Chemical Co., Pittsburgh, Pa.
[2] Blend of Tetramethyl thiuram disulfide and mercaptobenzothiazole.
[3] Non-reactive phenol aldehyde resin sold by Rohm and Haas Co., Philadelphia.

Each of the above compounds were mixed in the conventional manner on a two roll mill. At the completion of the mixing operation, each rubbery batch was removed from the mill and passed through an extruder to shape it to the size and shape of a white sidewall member. Each member was vulcanized on a tire sidewall in the normal vulcanizing operation and when the tire was removed from the mold, it was found that each sidewall was white and unstained. The adhesion of the sidewall to the tire carcass was excellent.

In the modification of the invention wherein chlorinated butyl is used with the non-reactive phenol aldehyde resin without chlorosulfonated polyethylene the resin content may vary from 2 to 15 parts with 10 parts preferred. The non-reactive phenol aldehyde resin represented in the formulae is used in amounts of from 2 to 10 parts with 5 parts being preferred when chlorosulfonated polyethylene is present. The latter material is used in amounts of from 5 to 20 parts with 20 parts preferred. All parts in the foregoing and the following formulae and claims as based on 100 parts of rubber hydrocarbon type material with chlorosulfonated polyethylene being considered a rubber hydrocarbon type material. Natural rubber is used only to add tack to Formula 1 of the example.

The following formula illustrates the type of body stock used in a black sidewall tire which normally could not be used in a white sidewall tire. The stock contains staining migratory pigments which would stain conventional white walls but when used in the combination of the invention do not stain the white wall of the finished tire. In this and in all the formulations in the specification and in the limitations in the claims, all parts are based on 100 parts by weight of rubber hydrocarbon or equivalent:

BLACK TIRE BODY COMPOUND

| | |
|---|---|
| Crude natural rubber | 67 |
| Reclaimed rubber | 60 |
| Plasticizer (oil) | 2 |
| Pine tar | 2 |
| Stearic acid | 1.5 |
| Burgundy pitch | 2 |
| Phenol beta naphthylamine | 1 |
| Zinc oxide | 3 |
| Clay | 15 |
| Sulfur | 2.8 |
| Rubber vulcanizing accelerator | .7 |
| | 157.0 |

Figure 2:
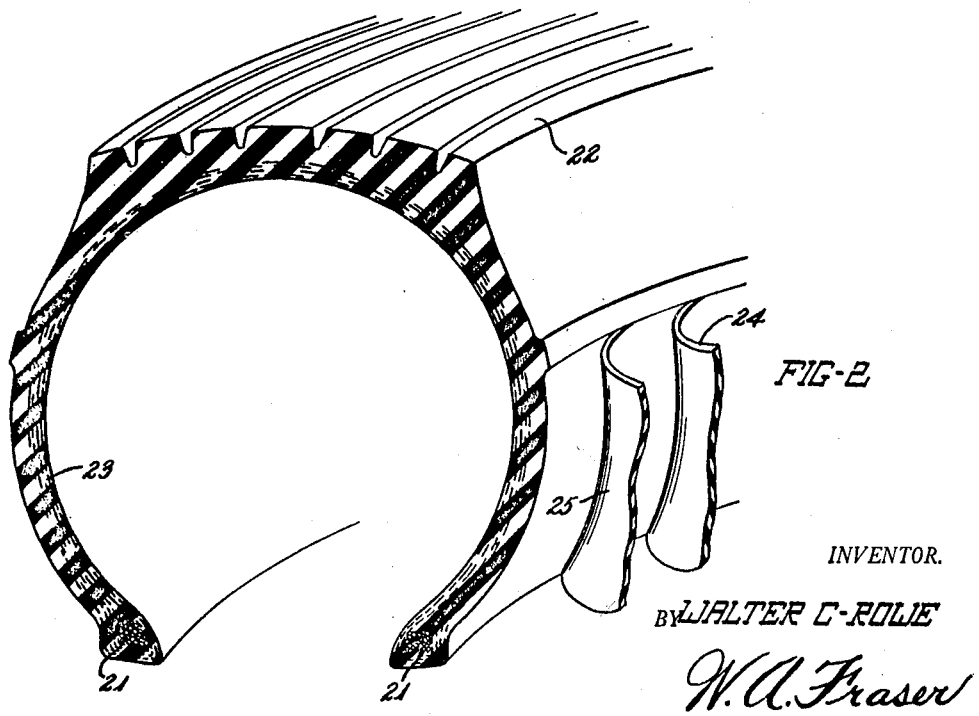
Fig. 2 is a perspective view partially in section of a black sidewall tire showing the use of a barrier of the novel composition between the body and the white sidewall portions.

In a modified form of the invention, each of the compositions disclosed in the table may be used as a barrier material between the staining black body containing the formula aforementioned and a normal white sidewall compound. When used as barriers, the novel materials are sheeted out into thin strips and laid on the tire carcass between the stainable white sidewall compound and the staining black tire body. The tire is vulcanized in a conventional manner in the mold and produces a non-stainable white sidewall tire as shown in Fig. 2. The tire in Fig. 2 is comprised of a body portion 23 terminating at the edges in two beads 21—21 and the conventional tread and black sidewall. The body portion 23 is comprised of fabric strain members calendered with a stainable black body stock as set forth heretofore. In this modification of the invention, a chlorinated butyl rubber compound modified as shown in any of the Formulae 1–3 in Example I is formed in a suitable manner into a sheet 25 which is superimposed on the stainable tire carcass. Over this is vulcanized a white sidewall member 24 which would normally stain if it were not for the presence of the barrier 25. Such a tire is cheap and easy to manufacture and in road service gives long tire life.

A suitable white sidewall compound for use with the second modification of the invention and a compound which will stain if exposed to staining oils is as follows:

STAINABLE WHITE SIDEWALL COMPOUND
(For use with Barrier)

| | |
|---|---|
| Crude pale crepe rubber (natural) | 100 |
| Pine oil | 1 |
| Stearic acid | 1 |
| Wax | 2 |
| Ultramarine blue | .25 |
| Zinc oxide | 5 |
| White filler pigments | 25 |
| Sulfur | 3.25 |
| Rubber vulcanizing accelerator | 1.5 |
| | 214.00 |

Although several forms of the invention have been illustrated by way of example, it will be apparent to those skilled in the art that many variations thereof are possible. I do not wish therefore to be limited to the precise embodiment or composition shown or the method disclosed as an example but only by the prior art and the scope of the appended claims.

I claim:

1. In a white sidewall tire, in combination, a fabric body portion having a rubbery coating containing migratory staining materials which would normally stain the sidewall terminating at the edges in two bead portions, a tread portion superimposed upon and bonded to said body portion and a non-staining, weather resistant, white sidewall portion bonded to one side of said body portion, said white sidewall portion comprised of a chlorinated rubbery copolymer of from 80 to 99.5 parts of an isoolefin having from 4 to 8 carbon atoms, from .5 to 20 parts of a conjugated diolefin having from 4 to 7 carbon atoms, said copolymer containing from .8% to 1.5% chlorine based on the weight of said material and from 2–15 parts of a nonheat-reactive phenol-aldehyde resin prepared by reacting one mole of a para substituted phenol with one mole of an aldehyde in an acid medium.

2. In a white sidewall tire, in combination, a fabric body portion having a rubbery coating containing migratory staining materials which would normally stain the sidewall terminating at the edges in two bead portions, a tread portion superimposed upon and bonded to said body portion and a non-staining, weather resistant, white sidewall portion bonded to one side of said body portion, said white sidewall portion comprised of a chlorinated rubbery copolymer of from 80 to 99.5 parts of an isoolefin having from 4 to 8 carbon atoms and from .5 to 20 parts of a conjugated diolefin having from 4 to 7 carbon atoms, said copolymer containing from .8% to 1.5% chlorine based on the weight of said material, from 5 to 20 parts of chlorosulfonated polythene based on the weight of said copolymer, and from 2 to 10 parts of a nonheat-reactive phenol-aldehyde resin prepared by reacting one mole of a para substituted phenol with one mole of an aldehyde in an acid medium.

3. In a white sidewall tire, in combination, a body portion having a rubbery coating containing migratory staining materials which would normally stain the sidewall terminating at the edges in two bead portions, a tread portion superimposed upon and bonded to said body portion and a non-staining, weather resistant, white sidewall portion bonded to one side of said body portion, said white sidewall portion comprised of a chlorinated rubbery copolymer of from 80 to 99.5 parts of an isoolefin having from 4 to 8 carbon atoms, from .5 to 20 parts of isoprene, said copolymers containing from .8% to 1.5% chlorine based on the weight of said material, and from 5 to 20 parts of chlorosulfonated polythene based on the weight of said copolymer, and from 2 to 15 parts of a nonheat-reactive phenol-aldehyde resin prepared by reacting one mole of a para substituted phenol with one mole of an aldehyde in an acid medium.

4. In a white sidewall tire, in combination, a body portion having a rubbery coating containing migratory staining materials which would normally stain the sidewall terminating at the edges in two bead portions, a tread portion superimposed upon and bonded to said body portion and a non-staining, weather resistant, white sidewall portion bonded to one side of said body portion, said white sidewall portion comprised of a chlorinated rubbery copolymer of from 80 to 99.5 parts of an isoolefin having from 4 to 8 carbon atoms and from .5 to 20 parts of isoprene, said copolymer containing from .8% to 1.5% chlorine based on the weight of said material, from 5 to 20 parts of chlorosulfonated polythene based on the weight of said copolymer and about 5 parts of a nonheat-reactive phenol-aldehyde resin prepared by reacting one mole of a para substituted phenol with one mole of an aldehyde in an acid medium.

5. In a white sidewall tire, in combination, a fabric body portion having a rubbery coating containing migratory staining materials which would normally stain the sidewall terminating at the edges in two bead portions, a tread portion superimposed upon and bonded to said body portion and a non-staining, weather resistant, white sidewall portion bonded to one side of said body portion, said white sidewall portion comprised of a chlorinated rubbery copolymer of from 80 to 99.5 parts of an isoolefin having from 4 to 8 carbon atoms, from .5 to 20 parts of a conjugated diolefin having from 4 to 7 carbon atoms, said copolymer containing about 1% chlorine based on the weight of said material, and about 10 parts of a nonheat-reactive phenol-aldehyde resin prepared by reacting one mole of a para substituted phenol with one mole of an aldehyde in an acid medium.

6. In a vulcanized laminated rubbery article, in combination, a stain producing portion containing migratory staining materials, and a non-staining, weather resistant, stain resisting portion vulcanized thereto, said stain resisting portion comprised of a chlorinated rubbery copolymer of from 80 to 99.5 parts of an isoolefin having from 4 to 8 carbon atoms and from .5 to 20 parts of an open chain conjugated diolefin having from 4 to 7 carbon atoms, said copolymer containing from .8% to 1.5% chlorine, from 5 to 20 parts of chlorosulfonated polythene, and from 2 to 10 parts of a nonheat-reactive phenol-aldehyde resin prepared by reacting one mole of a para substituted phenol with one mole of an aldehyde in an acid medium.

7. In a light colored article, the combination of a rubber layer containing migratory stain producing materials, a stainable light colored rubbery layer and a non-staining barrier sheet impervious to migration of staining materials separating said stain producing layer from said stainable layer, said barrier comprised of a blend of a chlorinated rubbery copolymer of from 80 to 99.5% of an isoolefin having from 4 to 8 carbon atoms and a conjugated diolefin having from 4 to 7 carbon atoms combined with about 1% chlorine, from 5 to 20 parts of chlorosulfonated polythene and about 5 parts of a nonheat-reactive phenol-aldehyde resin prepared by reacting one mole of a para substituted phenol with one mole of an aldehyde in an acid medium, the barrier sheet bonded to the carcass and sidewall.

References Cited in the file of this patent

UNITED STATES PATENTS

| | | |
|---|---|---|
| 2,240,855 | Phillips | May 6, 1941 |
| 2,240,856 | Phillips | May 6, 1941 |
| 2,566,328 | Hessney et al. | Sept. 4, 1951 |
| 2,566,329 | Hessney | Sept. 4, 1951 |
| 2,574,233 | Wolf | Nov. 6, 1951 |

(Other references on following page)

UNITED STATES PATENTS

| | | |
|---|---|---|
| 2,631,984 | Crawford | Mar. 17, 1953 |
| 2,700,997 | Morrissey et al. | Feb. 1, 1955 |
| 2,702,286 | Iknayan et al. | Feb. 15, 1955 |
| 2,720,479 | Crawford et al. | Oct. 11, 1955 |
| 2,726,224 | Peterson | Dec. 6, 1955 |
| 2,727,874 | Peterson | Dec. 20, 1955 |
| 2,731,060 | Rowe | Jan. 17, 1956 |
| 2,732,354 | Morrissey et al. | Jan. 24, 1956 |
| 2,734,039 | Peterson et al. | Feb. 7, 1956 |
| 2,749,323 | Schaefer et al. | June 5, 1956 |
| 2,817,616 | Wolfe | Dec. 24, 1957 |
| 2,844,502 | Paxton | July 22, 1958 |